United States Patent
Ikram

(10) Patent No.: US 9,729,968 B2
(45) Date of Patent: Aug. 8, 2017

(54) METHOD AND SYSTEM FOR ACOUSTIC ECHO CANCELLATION USING CASCADED KALMAN FILTERING

(71) Applicant: Texas Instruments Incorporated, Dallas, TX (US)

(72) Inventor: Muhammad Zubair Ikram, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 24 days.

(21) Appl. No.: 14/638,974

(22) Filed: Mar. 4, 2015

(65) Prior Publication Data
US 2015/0256929 A1 Sep. 10, 2015

Related U.S. Application Data

(60) Provisional application No. 61/948,361, filed on Mar. 5, 2014.

(51) Int. Cl.
H04R 3/02 (2006.01)
H04M 3/00 (2006.01)

(52) U.S. Cl.
CPC ........... H04R 3/02 (2013.01); H04M 3/00 (2013.01); H04R 2499/11 (2013.01)

(58) Field of Classification Search
CPC .................................................. H04M 9/082
See application file for complete search history.

(56) References Cited

PUBLICATIONS

Mossi, M. I., Yemdji, C., Evans, N., Beaugeant, C., & Degry, P. (May 2011). Robust and low-cost cascaded non-linear acoustic echo cancellation. In 2011 IEEE International Conference on Acoustics, Speech and Signal Processing (ICASSP) (pp. 89-92). IEEE.*
Paleologu, C., Benesty, J., & Ciochină, S. (May 2013). Study of the optimal and simplified Kalman filters for echo cancellation. In 2013 IEEE International Conference on Acoustics, Speech and Signal Processing (pp. 580-584). IEEE.*
Kamen, E. W., & Su, J. K. (1999). Introduction to optimal estimation. Springer Science & Business Media (pp. 149-189).*

* cited by examiner

*Primary Examiner* — Joseph Saunders, Jr.
(74) *Attorney, Agent, or Firm* — Gregory J. Albin; Charles A. Brill; Frank D. Cimino

(57) ABSTRACT

A method and a system for echo cancellation. The method includes receiving incoming downlink signal sample, performing Kalman filter time update of linear filter, constructing data matrix for linear filter adaptation, performing Kalman filter measurements update on linear filter, performing Kalman filter time update on non-linear filter, constructing data matrix for non-linear filter adaptation, performing Kalman filter measurements update on non-linear filter, generating echo using adapted linear and non-linear filters, subtracting the echo from microphone signal to generate echo free uplink signal, and uplinking the echo free signal to the far-end.

3 Claims, 3 Drawing Sheets

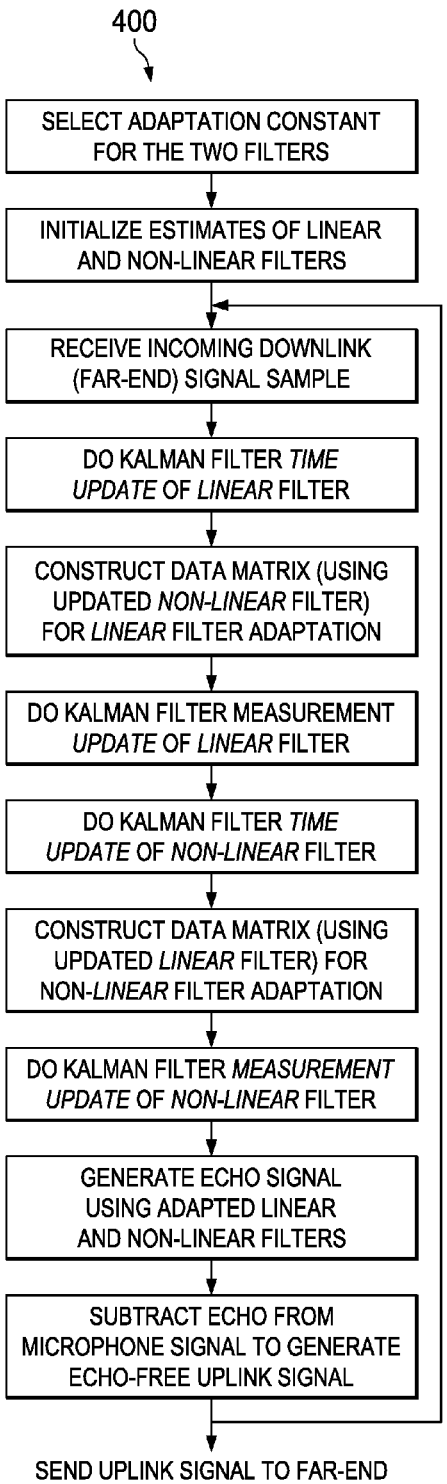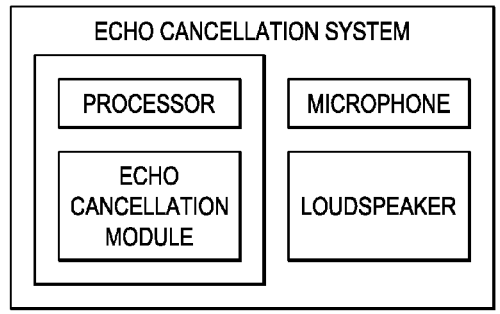
FIG. 5
FIG. 4

METHOD AND SYSTEM FOR ACOUSTIC ECHO CANCELLATION USING CASCADED KALMAN FILTERING

CROSS REFERENCES TO RELATED APPLICATIONS

This application claims priority from U.S. Provisional Patent Application No. 61/948,361 filed on Mar. 5, 2014, which is hereby incorporated by reference in its entirety.

BACKGROUND OF THE INVENTION

Field of the Invention

Embodiments of the present invention generally relate to a method and system for acoustic echo cancellation using cascaded Kalman filtering.

Description of the Related Art

Acoustic echo cancellation (AEC) has been an area of active research for the past many decades. As AEC is implemented in newer and sophisticated devices, it is expected that its performance is also improved over the devices of prior generation. Various aspects of AEC have been investigated in the past; this includes double-talk, convergence, stereo-echo cancellation, etc. One of the issues that has limited the performance of a practical echo canceller is non-linearity of the echo path. A typical echo canceller is designed assuming that the echo path is linear and modeled by a linear finite impulse response (FIR) filter. Consequently, the echo cancelling filter is also modeled as linear. In practical applications, like cell phones, the echo path is non-linear because of imperfections introduced by the data converter, amplifier and the loudspeaker operating close to saturation. Attempting to cancel non-linear echo using a linear FIR filter leaves residual echo in the uplink signal resulting in annoying user experience.

Several methods have been proposed in the past to address the non-linear echo cancellation. Popular among them are the Volterra filter based methods. These methods, however, suffer from high complexity because of large number of filter parameters to adapt. A large class of methods started with an assumption of a non-linear model. There are mainly two such models; memoryless non-linearity is used for smaller loudspeakers used in portable handheld devices like cell phones. On the other hand, non-linearity with memory is generally employed in high-end audio devices like precision audio systems.

Therefore, there is a need for a method and/or system for an improved acoustic echo cancellation in the presence of unavoidable non-linearity in the echo path.

SUMMARY OF THE INVENTION

Embodiments of the present invention relate to a method and a system for echo cancellation. The method includes receiving incoming downlink signal sample, performing Kalman filter time update of linear filter, constructing data matrix for linear filter adaptation, performing Kalman filter measurements update on linear filter, performing Kalman filter time update on non-linear filter, constructing data matrix for non-linear filter adaptation, performing Kalman filter measurements update on non-linear filter, generating echo signal using adapted linear and non-linear filters subtracting the echo from microphone signal to generate echo free uplink signal, and sending the echo free signal to the far-end.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is an embodiment of a flow diagram of an echo cancellation method using cascaded Kalman filtering; and FIG. 5 is an embodiment of a system diagram utilizing the method of FIG. 4.

DETAILED DESCRIPTION

Herein, the non-linear echo path is modeled by a memoryless non-linearity followed by a linear FIR filter. The problem is cast into a state-space framework and solved using a cascade of Kalman filters in time domain, one filter adapting to the linear echo path and the other to the memoryless non-linearity. It is shown that the proposed method outperforms the existing NLMS-based method in filter converge and misalignment while enjoying an additional benefit of unsupervised and variable step-size control. Experimental result is presented below to exhibit performance improvements and advantages.

Figure 1A:
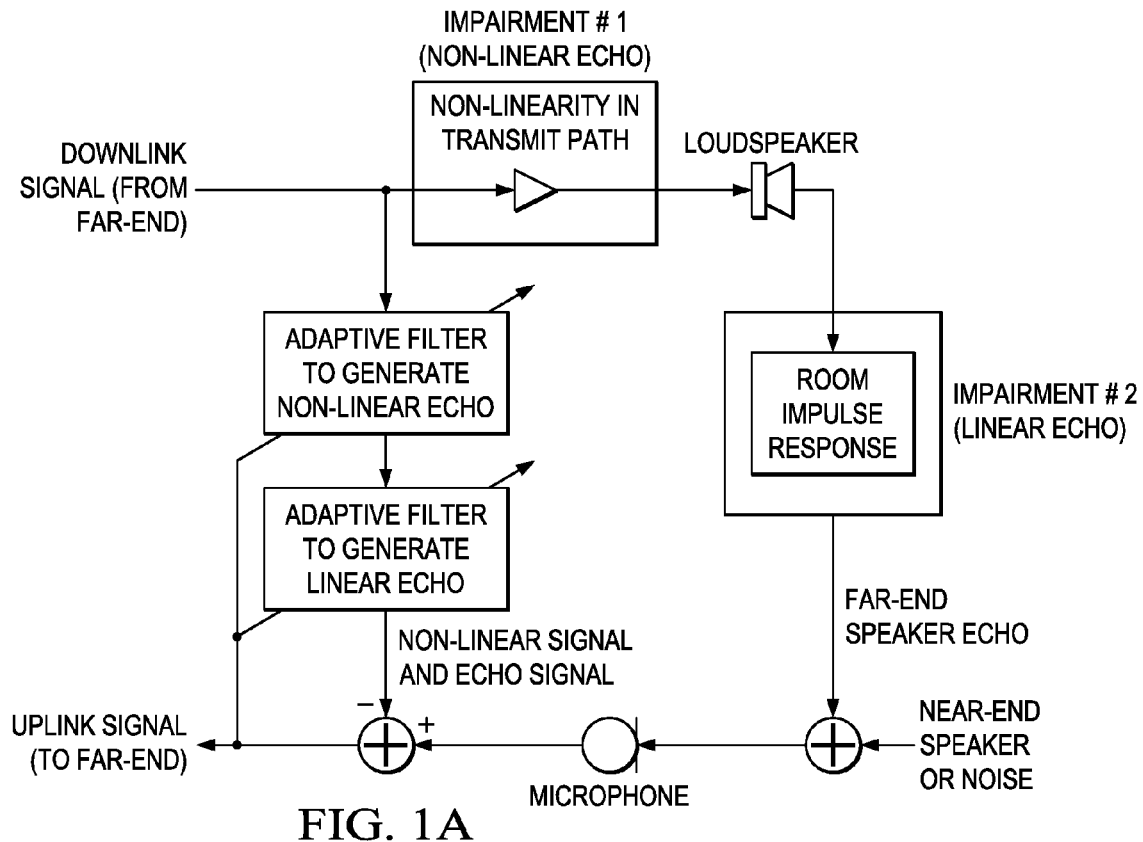
FIG. 1A-B are an embodiments of a block diagram depicting an acoustic echo cancellation using cascaded Kalman filtering.
Figure 1B:
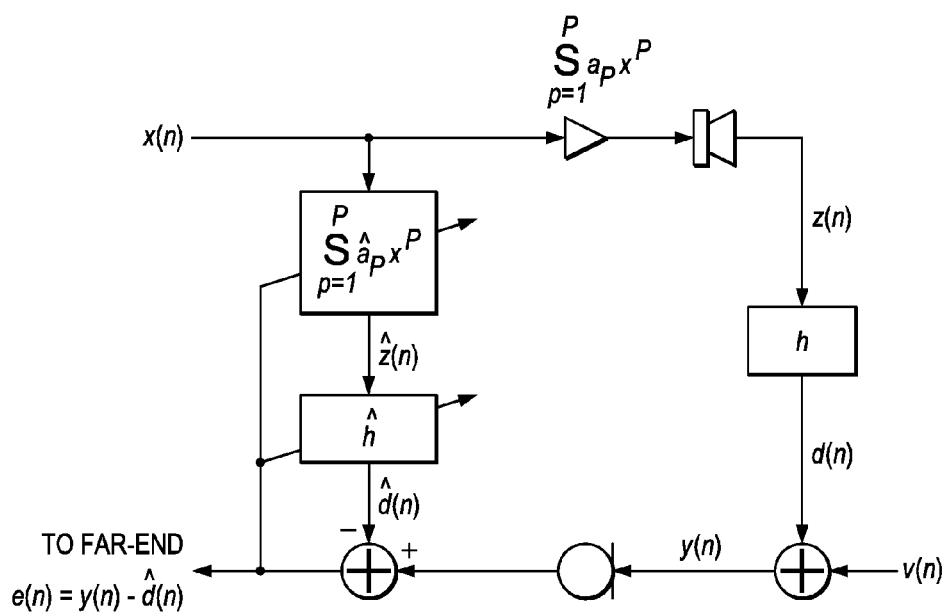

FIG. 1A and FIG. 1B are an embodiments of a block diagram depicting an acoustic echo cancellation apparatus using cascaded Kalman filtering. The acoustic echo cancellation apparatus comprises a loudspeaker, microphone and two adaptive filters. The loudspeaker receives an incoming downlink and produces output that has non-linearity in it. The non-linear loudspeaker output is then passed through room impulse response, which has an effect of introducing linear echo. That signal incorporated with the signal from the near end speaker is then the input into the microphone. The downlink signal is subjected to the two adaptive filters to identify the echo signal in the microphone's output signal. One adaptive filter is a Kalman linear filter and the second one is a Kalman non-linear filter. The output of both filters is the combined with the output signal from the microphone to remove the echo from the uplinked signal.

In order to compensate for the non-linearity and linear echo, a set of adaptive filters are placed in parallel to the echo path as shown in FIG. 1B. These filters are learned to cancel the echo in the uplink channel. In one embodiment, the method uses state-space formulation to model the non-linear echo cancellation problem. By various mathematical manipulations, the non-linear AEC model is transformed to state-space model consisting of an observation equation and a state equation and a cascaded Kalman filters is used to operate sequentially for updating the unknown filter coefficients. As a result, faster convergence is achieved without the need of controlling the step size. Furthermore, the filter misalignment is also improved when compared with the prior state of the art. The filter misalignment is normalized mean squared error difference of adapted filter and the true filter.

The non-linear echo cancellation problem is depicted in FIG. 1B, where the echo path is modeled as a cascade of memoryless non-linearity followed by an FIR filter that models the linear echo path. The output of the non-linear part is given by $$z(n) = \sum_{p=1}^{P} a_p x^p(n) = a^T x(n), \quad (1)$$

Where $a=[a_1\ a_2\ \ldots\ a_P]^T$, $x(n)=[x(n)\ x^2(n)\ \ldots\ x^P(n)]^T$, P is order of the non-linearity, and $(\cdot)T$ denotes conjugate transposition.

$$d(n) = \sum_{k=0}^{K-1} h_k z(n-k) = h^T z(n), \quad (2)$$

Where $h=[h_1\ h_2\ \ldots\ h_{k-1}]^T$, $z(n)=[z(n)\ x(n-1)\ \ldots\ z^P(n-k=1)]^T$ and K is order of the FIR filter. Using (1) and (2), the echo input to the microphone is given by:

$$d(n)=a^T X(n)h=h^T X^T(n)a, \quad (3)$$

where $$X(n) = \begin{pmatrix} x(n) & x(n-1) & \ldots & x(n-K+1) \\ x^2(n) & x^2(n-1) & \ldots & x^2(n-K+1) \\ \vdots & \vdots & \ddots & \vdots \\ x^P(n) & x^P(n-1) & \ldots & x^P(n-K+1) \end{pmatrix}. \quad (4)$$

The microphone input signal consists of echo and the near-end noise v(n), resulting in $$y(n)=d(n)+v(n). \quad (5)$$

In one embodiment, the signal v(n) could also be a near-end speaker. Referring to FIG. 1B, the error output is given by $$e(n)=y(n)-\hat{d}(n). \quad (6)$$

In one embodiment, a state-space framework is used to model the non-linear AEC. Accordingly, the task of controlling the step size is minimized and the number of unknown parameters to be estimated is not increased while the convergence rate and the filter misalignment is significantly improved.

In an attempt to solve the problem using Kalman filter, the state and measurement (observation) equations are setup for estimating the non-linear filter parameters a and the FIR filter parameters h. Thu, the output of the two adaptive filters, d(n), as follows:

$$d(n)=[a^T x(n) a^T x(n-1) \ldots a^T x(n-K+1)]h. \quad (7)$$

Using (5), M measurements are stacked in a vector to obtain (12), which can be compactly written as follows:

$$y(n)=X_a(n)h+v(n), \quad (8)$$

where v(n) is vector of measurement noise with covariance matrix R of dimension M×M. The state update equation is written as $$h(n)=h(n-1)+w_h(n), \quad (9)$$

where $w_h(n)$ is the process noise with K×K covariance matrix $Q_h$ and is assumed to be uncorrelated with v(n). Similarly, in order to solve for the non-linear filter coefficients a(n), the output d(n) is expressed as follows $$d(n)=[h^T \tilde{x}(n) h^T \tilde{x}^2(n) \ldots h^T \tilde{x}^P(n)]a, \quad (10)$$

where $$x(n)=[x(n) x(n-1) \ldots x(n-K+1)]T. \quad (11)$$

Again, putting together M measurements in a vector form gives (13), which can be expressed as $$y(n)=X_h(n)a+v(n). \quad (14)$$

The state update for a is $$a(n)=a(n-1)+w_a(n), \quad (15)$$

where $w_a(n)$ is process noise associate with covariance matrix Qa of dimension P×P. Equations (8), (9) and Equations (14), (15) captures the dynamics of the non-linear AEC system, and these sets of equations forms the basis of the dual Kalman filter.

The Kalman filter consists of a time update and a measurement update. In the time update, the filter coefficients and their error covariance at time n are updated using only the measurements available until the previous time instant n−1. Such estimates are referred to as a priori estimates and are denoted using $(\cdot)^-$. The time update for $a^-(n)$ is given by $$\hat{a}^-(n)=\hat{a}(n-1) \quad (16)$$

$$P_a^-(n)=P_a(n-1)+Q_a. \quad (17)$$

The error covariance is defined as $$P_a^-(n)=Cov[a(n)-\hat{a}^-(n)]. \quad (18)$$

As the measurement at time n become available, the parameter estimates and their error variance estimates are updated in the measurement update as follows:

$$K_a(n)=P_a^-(n)X_{\hat{h}}^T(n)[X_{\hat{h}}(n)P_a^-(n)X_{\hat{h}}^T(n)+R]^{-1} \quad (19)$$

$$\hat{a}(n)=\hat{a}^-(n)+K_a(n)[y(n)-X_{\hat{h}}(n)\hat{a}^-(n)] \quad (20)$$

$$P_a(n)=P_a^-(n)-K_a(n)X_{\hat{h}}(n)P_a^-(n-1), \quad (21)$$

Where $K_a(n)$ is commonly referred to as Kalman gain and the error covariance $P_a(n)$ is defined by replacing $a^-(n)$ with a(n) in (18).

Similar set of time and measurement updates can be developed for estimating h.

$$\hat{h}^-(n)=\hat{h}(n-1) \quad (22)$$

$$P_h^-(n)=P_h(n-1)+Q_h. \quad (23)$$

The measurement update for $\hat{h}(n)$ comprises of the following steps.

$$K_h(n)=P_h^-(n)X_{\hat{a}}^T(n)[X_{\hat{a}}(n)P_h^-(n)X_{\hat{a}}^T(n)+R]^{-1} \quad (24)$$

$$\hat{h}(n)=\hat{h}^-(n)+K_h(n)[y(n)-X_{\hat{a}}(n)\hat{h}^-(n)] \quad (25)$$

$$P_h(n)=P_h^-(n)-K_h(n)X_{\hat{a}}(n)P_h^-(n-1). \quad (26)$$

The data matrices $\hat{X}a(n)$ and $\hat{X}h(n)$ are obtained by using the parameter estimates $a^-(n)$ and $h^-(n)$ in (12) and (13), respectively. These matrices are updated at each iteration. Since only a data sample is updated at each time iteration, the data matrices are only shuffled to include the new value and does not require a re-computation. The Kalman filter begins with appropriate initialization of $a^-(0)$ and $h^-(0)$ as well as for the error-covariance matrices $P_a(0)$ and $P_h(0)$.

Let us review the time and measurement update equations and draw some comparisons with the classical normalized least-mean squares (NLMS) or recursive least squares (RLS) based adaptation methods. In (20) and (25) it is seen that the error is weighted by the Kalman gain of (19) and (24), respectively to update the state vectors. This is in a way similar to NLMS processing where the normalized step size is used in filter update. In contrast to the NLMS update, which requires judicious choice of step size, the Kalman gain is computing as part of the measurement update using the noise covariance and the downlink data. The Kalman filter based non-linear AEC, therefore, works like a variable step size adaptive filter. As a result, this helps in promoting the convergence while the filter misalignment is improved.

Like in traditional Kalman filter, the choice of process noise $Q_h$ and $Q_a$ plays a key role in the cascaded adaptive filter framework. A smaller value of this noise variance implies smaller adaptive filter updates, whereas a larger value results in bigger update $$\begin{pmatrix} y(n) \\ y(n-1) \\ \vdots \\ y(n-M+1) \end{pmatrix} = \begin{pmatrix} a^T x(n) & a^T x(n-1) & \cdots & a^T x(n-K+1) \\ a^T x(n-1) & a^T x(n-2) & \cdots & a^T x(n-K) \\ \vdots & \vdots & \ddots & \vdots \\ a^T x(n-M+1) & a^T x(n-M) & \cdots & a^T x(n-K-M+2) \end{pmatrix} h + \begin{pmatrix} v(n) \\ v(n-1) \\ \vdots \\ v(n-M+1) \end{pmatrix} \quad (12)$$

$$\begin{pmatrix} y(n) \\ y(n-1) \\ \vdots \\ y(n-M+1) \end{pmatrix} = \begin{pmatrix} h^\gamma \hat{x}(n) & h^T \hat{x}^\gamma(n) & \cdots & h^T \hat{x}^P(n) \\ h^\gamma \hat{x}(n-1) & h^T \hat{x}^\gamma(n-1) & \cdots & h^T \hat{x}^P(n-1) \\ \vdots & \vdots & \ddots & \vdots \\ h^\gamma \hat{x}(n-M+1) & h^T \hat{x}^\gamma(n-M+1) & \cdots & h^T \hat{x}^P(n-M+1) \end{pmatrix} h + \begin{pmatrix} v(n) \\ v(n-1) \\ \vdots \\ v(n-M+1) \end{pmatrix} \quad (13)$$

Figure 2:
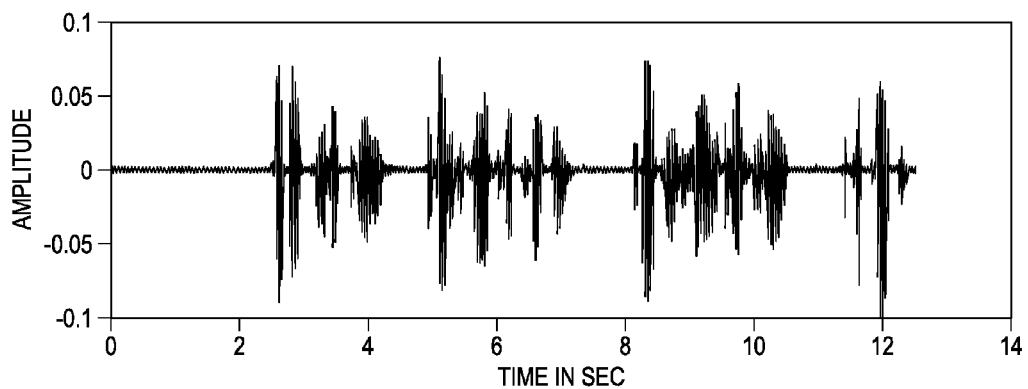
FIG. 2 is an embodiment of a graph depicting a microphone signal y(n)

We compared the performance of the proposed method against the dual adaptive filter method, where the linear and non-linear filter coefficients were updated using NLMS adaptation. FIG. 2 is an embodiment of a graph depicting a microphone signal y(n). In FIG. 2, the microphone is signal y(n), which was generated by passing x(n) through a P=5-pt non-linear filter and a K=256-pt FIR filter. As the filter parameters are learned, the performance is measured by computing the misalignment as follows:

$$\text{Misalignment of } h(n) = 20\log_{10} \frac{\|\hat{h}(n) - h\|}{\|h\|} \quad (27)$$

$$\text{Misalignment of } a(n) = 20\log_{10} \frac{\|\hat{a}(n) - a\|}{\|a\|}. \quad (28)$$

Figure 3:
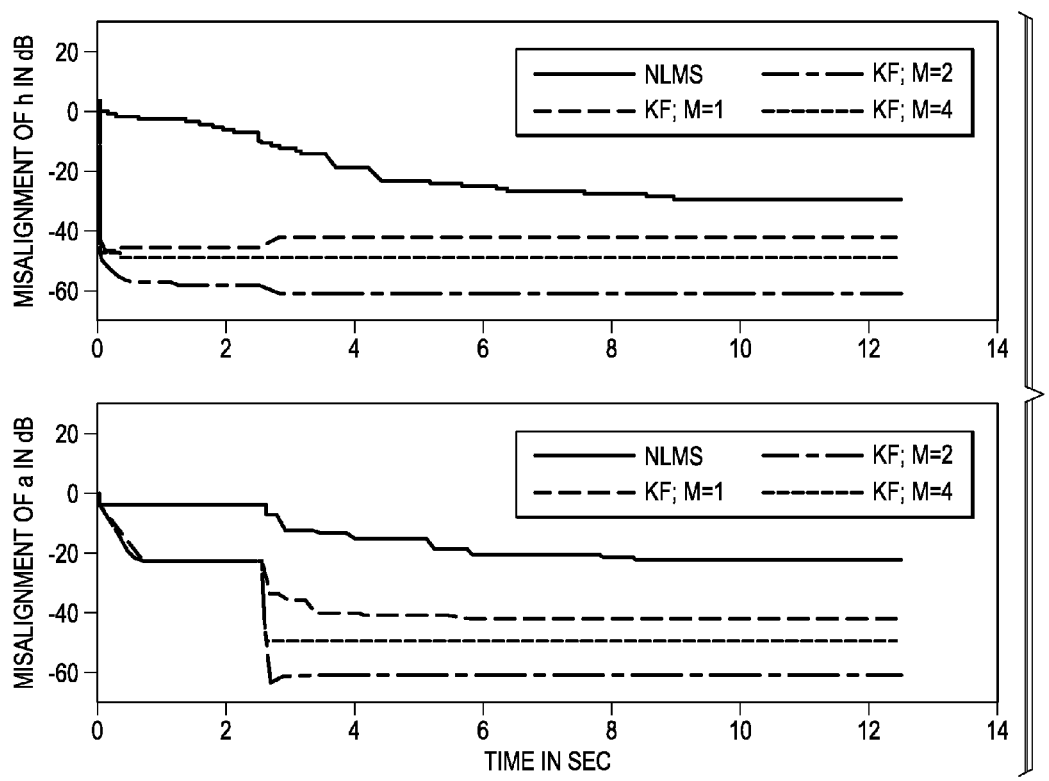
FIG. 3 is an embodiment of a comparison between the signal of echo cancellation method using cascaded Kalman filtering and the signal of a signal of a normalized least mean squares.

For the proposed method, $Q_h = 1 \ e^{-8}I$ and $Q_a = 1e^{-3}I$ are used, where I is an identity matrix of appropriate dimension. The matrix R was set to $1e^{-8}I$ by estimating the noise variance in the silence interval. The matrices $P_h(0)$ and $P_a(0)$ were initialized with identity matrices. In one embodiment, M is set for M=1, 2, and 4. The adaptive filters to result in best performance by setting the step sizes of $a^-(n)$ and $h^-(n)$ to be equal to 0.2 and 0.5. The comparative results to the prior solution are shown in FIG. 3. FIG. 3 is an embodiment of a comparison between the signal of echo cancellation method using cascaded Kalman filtering and the signal of echo cancellation method using NLMS.

The performance of the proposed Kalman-filter based non-linear AEC solution is better than the NLMS-based algorithm in both convergence and misalignment for all values of M. Furthermore, the performance of the proposed method is optimal for M=2; i.e., the case where only 2 measurements are stacked in the vectors of (12) and (13). This also implies that with only a moderate increase in complexity over the single observation model (M=1), significant performance is obtained that is maintained as M is increased.

A state-space framework is developed to solve the non-linear acoustic echo cancellation problem. Both the linear as well as non-linear blocks of the echo model are assumed unknown and adapted using a set of properly designed Kalman filters running back to back on a per-sample basis. With such an arrangement, improvements in convergence and misalignment are obtained over NLMS-based adaptation. As such, guidelines are suggested on using the proposed algorithm. The results show that with only a minor increase in complexity significant improvement is obtained over the single-snapshot Kalman filter implementation.

FIG. 4 is an embodiment of a flow diagram of an echo cancellation method 400 using cascaded Kalman filtering. At step 402, the method 400 selects adaptation constant for the two filters. At step 404, the method 400 initializes estimates of linear and non-linear filters. At step 406, the method 400 receives incoming downlink (far end) signal sample. At step 408, the method 400 performs Kalman filter time update of linear filter. At step 410, the method 400 constructs data matrix for linear filter adaptation, i.e. using time-updated linear filter. At step 412, the method 400 performs Kalman filter measurements update of linear filter. At step 414, the method 400 performs Kalman filter time update of non-linear filter. At step 416, the method 400 constructs data matrix for non-linear filter adaptation. At step 418, the method 400 performs Kalman filter measurements update of non-linear filter. At step 420, the method 400 generates echo using the updated linear and non-linear filters. At step 422, the method 400 subtracts the echo generated in step 420 from microphone signal to generate echo free uplink signal, which is uplinked to far-end.

FIG. 5 is an embodiment of an echo cancellation system diagram utilizing the method of FIG. 4. The echo cancellation system comprises a processor, a loudspeaker, a microphone, and an echo cancellation module. The processor is capable of executing instruction to perform functions, such as, the functions described herein. The microphone and loudspeaker function as described in FIG. 1A and FIG. 1B. The echo cancellation module performs the method 400 of FIG. 4.

While the foregoing is directed to embodiments of the present invention, other and further embodiments of the invention may be devised without departing from the basic scope thereof, and the scope thereof is determined by the claims that follow.

What is claimed is:

1. An echo cancellation method, comprising:
   receiving an incoming downlink signal;
   using a first Kalman filter to estimate filter parameters for a non-linear filter;
   using a second Kalman filter and state parameters of the first Kalman filter to estimate filter parameters for a linear filter;
   applying the non-linear filter and the linear filter to the incoming downlink signal to generate a filtered downlink signal; and
   subtracting the filtered downlink signal from a microphone signal to generate an output signal.

2. The echo cancellation method of claim 1, further comprising:
   selecting adaptation constants for the linear and non-linear filters; and
   initializing estimates of linear and non-linear filters.

3. An echo cancellation system, comprising:
   a processor;
   a microphone coupled to the processor;
   a speaker coupled to the processor, wherein the processor is configured to:
   receive an incoming downlink signal;
   use a first Kalman filter to estimate filter parameters for a non-linear filter;
   use a second Kalman filter and state parameters of the first Kalman filter to estimate filter parameters for a linear filter;
   apply the non-linear filter and the linear filter to the incoming downlink signal to generate a filtered downlink signal; and
   subtract the filtered downlink signal from a microphone signal to generate an output signal.

* * * * *